United States Patent Office 3,711,490
Patented Jan. 16, 1973

3,711,490
METHOD FOR PREPARING 2,3-PYRIDINEDIOL
John Valdemar Brammer Petersen and Niels Clauson-Kaas, Farum, Denmark, assignors to Ciba-Geigy Corporation
No Drawing. Division of application Ser. No. 751,650, June 25, 1968, now Patent No. 3,553,224, dated Jan. 5, 1971, which is a division of application Ser. No. 544,685, Apr. 25, 1966, now Patent No. 3,419,570. This application Aug. 19, 1970, Ser. No. 65,328
Int. Cl. C07d 31/30
U.S. Cl. 260—297 R
2 Claims

ABSTRACT OF THE DISCLOSURE 2,3-pyridinediol is prepared by a process comprising hydrolizing an alkali metal 3-hydroxy-2-oxo-1(2H)-pyridine sulfonate and recovering the 2,3-pyridinediol from the resulting hydrolyzate.

CROSS REFERENCE TO RELATED APPLICATIONS

This application is a division of our earlier copending application Ser. No. 751,650, filed June 25, 1968, now U.S. Pat. No. 3,553,224, dated Jan. 5, 1971, the latter being a division of our earlier application Ser. No. 544,685, filed Apr. 25, 1966, now U.S. Pat. No. 3,419,570.

DETAILED DESCRIPTION

The present invention relates to a process for the production of 2,3-pyridinediol.

More particularly, the present invention relates to a process for the production of 2,3-pyridinediol comprising
(a) hydrolizing an alkali metal 3-hydroxy-2-oxo-1(2H)-pyridine sulfonate of the formula

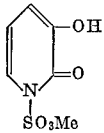

(I)

wherein Me is an alkali metal, and
(b) recovering the 2,3-pyridinediol from the resulting hydrolyzate.

According to a preferred embodiment, the 2,3-pyridinediol is recovered from the resulting hydrolyzate by extraction with ether.

Alkali metal salts of 3-hydroxy-2-oxo-1(2H)-pyridine sulfonic acid corresponding to Formula I used as starting materials, are prepared by a process which comprises
(1) reacting with each other in an aqueous medium, optionally with the addition of a catalyst,
(a) furfural,
(b) chlorine or an agent releasing chlorine in an aqueous medium, and
(c) sulfamic acid,
the molar ratio of (a) to (b) ranging from about 1:1 to 2:3, and the pH of the reaction mixture being held, upon addition of (c) thereto, below 2 and preferably below 0.5 and, optionally, below 0 throughout the remainder of the ensuing reaction thereof with (a) and (b);
(2) adding a cation-donating agent capable of dissociating in the reaction mixture with release of alkali-metal cations, in particular sodium ions, in a sufficient excess amount to precipitate, in the reaction mixture, the corresponding alkali metal salt, in particular the sodium salt, of 3-hydroxy-2-oxo-1(2H)-pyridine-sulfonic acid; and
(3) recovering the latter by separation from the reaction medium, e.g. by filtration.

In order to ensure precipitation of the last-mentioned alkali metal salt practically free from other byproducts, it is preferable to use in step (1) the pH below 0, and the total volume of the reaction mixture after addition of sulfaminic acid thereto should be less than 10 liters, and preferably only from 1 to 2 liters, calculated on every mole of furfural used as starting material.

The sodium salt is preferred because it precipitates more readily from the reaction mixture, than e.g. the potassium salt, the latter being of greater solubility in aqueous media.

The 2,3-pyridinediol can also be obtained from the reaction mixture containing 3-hydroxy-2-oxo-1(2H)-pyridine sulfonic acid without isolating the alkali metal salt, by storing this mixture at room temperature or heating it, optionally, after the addition of a substance or mixture of substances providing at least an equimolar content of alkali metal ions, preferably of sodium ions.

Water can serve as reaction medium for the chlorination and reaction with sulfamic acid; with high concentrations of the reaction components it is recommended to use a mixture of water and a solvent which is miscible therewith, or easily soluble therein such as, e.g. methanol, ethanol, propanol, isopropanol, tert.butanol, methoxyethanol, ethoxyethanol, n-butoxyethanol, dimethyl formamide, acetic acid or dioxane.

The chlorine can be introduced into the reaction, for example, in the gaseous state or as sodium hypochlorite. Examples of suitable catalysts for the chlorination are bromides and iodides which are soluble in the reaction medium such as sodium bromide or potassium iodide, or other inorganic compounds such as molybdenum salts which, in this step of the process, increase the yields in oxidation with halogen. The chlorination is preferably performed at a pH below 6.

Sulfamic acid, the amount of which should preferably be 0.5–1.5 mol calculated on the furfural, can be added to the aqueous chlorinated furfural solution either as such, or in the form of one of its salts, such as sodium salt, or the potassium salt. The ensuing reaction should be performed in a strongly acid, e.g. in 1 N to 3 N mineral acid medium, care being taken to ensure that the conversion of all chlorine introduced during the chlorination is practically complete.

Preferably, a mixture (a) of free sulfamic acid and a strong mineral acid, e.g. concentrated hydrochloric acid, is added to the aqueous chlorinated furfural solution (b) containing sufficient cation-donating agent to precipitate the desired end product, the mixture (a) of sulfamic acid and mineral acid being of sufficient strength to impart to the resulting reaction mixture of (a) and (b), a pH below 0.5 and preferably below 0.

This practically eliminates the possibility of a reaction between sulfamic acid and chlorinated furfural at a pH above 0.5 or higher, which reaction would lead to the formation of 3-hydroxy-2-imino-1(2H)-pyridine sulfonic acid as byproduct which latter acid is difficult to separate from the desired salt of 3-hydroxy-2-oxo-1(2H)-pyridine-sulfonic acid.

The pH desired in any phase of the sequence of reactions according to the invention, can be attained by the addition of compounds having a basic or acid reaction, provided that the pH has not already been suitably adjusted by the reaction components and reaction products. Suitable basic compounds are, e.g. hydroxides, carbonates or acetates of the alkali metals or of ammonium ions. Suitable acid compounds are, e.g. hydrochloric acid, sulfuric acid and acid sulfates as well as organic acids such as, e.g. acetic acid. The reaction with chlorine can be performed either before or after the addition of the sulfamic acid, but it is preferably performed beforehand. It is performed below 40° and above the solidification temperature of the reaction mixture, preferably however, between −10° and 10°

The reaction of sulfamic acid and the furfural solution which may already have been treated with chlorine, is performed within a temperature range which is limited by the crystallization point of the reaction mixture and the boiling point thereof; it is preferably performed, however, between 0° and 20°.

If, after the reaction last mentioned above, it is desired to isolate the sodium salt of 3-hydroxy-2-oxo-(2H)-pyridine sulfonic acid, at least equimolar amounts of sodium ions must be present in the reaction mixture or be added thereto after the reaction. Suitable agents for donating alkali metal ions are sodium hydroxide or sodium salts such as sodium chloride, sodium sulfate, sodium acetate, sodium sulfamate, sodium carbonate or sodium hydrogen carbonate, and the corresponding potassium compounds. The precipitated sodium 3-hydroxy-2-oxo-1(2H)-pyridine-sulfonate can be recovered by filtration and washing, e.g. with ethanol, in a pure form.

To produce 2,3-pyridinediol, either the isolated alkali metal 3-hydroxy-2-oxo-1(2H)-pyridine sulfonate can be stored with water at room temperature or heated for a short time, whereupon a quantitative yield of 2,3-pyridinediol is formed, or the above reaction mixture, which, optionally, but not necessarily, may contain an equimolar amount of alkali metal, e.g. sodium ions, i.e. in which the alkali metal 3-hydroxy-2-oxo-1(2H)-pyridine-sulfonate is present, can be stored at room temperature or boiled for a short time. The 2,3-pyridinediol formed is isolated by filtration or by extraction, e.g. with diethyl ether, from the aqueous reaction mixture. Finally, 2,3-pyridinediol can be obtained from the mother liquor, from which the sodium salt has been separated by storing or heating the latter and subsequent extraction, as described.

Thanks to the novel process of the present invention, 2,3-pyridinediol, which has hitherto been obtained only with difficulty, has been rendered easily accessible, so that, from an economic point of view also, it is now readily available as starting material for the production of valuable organic compounds. In particular, it can be used as coupling component in the production of novel azo dyes.

The following examples will serve to further typify the nature of the present invention, but they should not be construed as a limitation on the scope thereof.

EXAMPLE 1

(a) 71.0 g. of chlorine =42.8 ml., measured at −80°, 1.00 mol) are introduced through a cylindrical sintering glass tube at 0° while stirring well into a suspension of 96.1 g. (1.00 mol) of furfural in 700 ml. of water, the addition being made within 30 minutes. During the reaction, the furfural is dissolved and a slight amount (about 5 g.) of an oily substance separates out simultaneously which clings to the walls of the reaction vessel. 40% sodium hydroxide solution is then added dropwise while stirring at 0° until the pH is 2 (about 200 g., 2.0 mol). The reaction mixture is decanted from the oily precipitate and diluted with water to 1000 ml. If the pale yellow solution cannot be further worked up immediately, it is cooled to about −25° at which temperature it can be stored for about 1 day without any noticeable alteration.

(b) 30.0 g. (0.31 mol) of pulverised sulfamic acid, 100 ml. of water and 60 ml. of concentrated hydrochloric acid are mixed in a 1 liter flask and the suspension obtained is cooled to −5°. 200 ml. (about 0.20 mol) of a reaction solution according to (a) which has been stored for 4 weeks at −25°, are added all at once and the mixture is vigorously stirred for 1 hour at 10°. After about 5 minutes the sodium salt of 3-hydroxy-2-oxo-1(2H)-pyridine sulphonic acid begins to precipitate and the mixture quickly turns into a thin slurry. 350 ml. of ethanol are added, the suspension is cooled to −10° while stirring and is filtered through a sinter glass filter. The filter residue of white crystals of the sodium salt is washed on the filter (without stirring) with 80 ml. of ethanol and with diethyl ether and then, as a thin layer on paper, it is dried at room temperature. The yield of sodium salt is 19.2 g. (43% of the theoretical).

If in (b), instead of the stored reaction solution according to (a), a fresh solution is used, then 16.7 g. of pure sodium salt are obtained (37% of the theoretical).

(c) 15.0 g. (0.067 mol) of the sodium salt obtained according to (b) are suspended in 75 ml. of water and the suspension is boiled for 15 minutes. After cooling, 2.75 g. (0.067 mol) of 97.5%, solid sodium hydroxide are added and the suspension of 2,3-pyridinediol obtained is continuously extracted with diethyl ether for about 15 hours. The ethereal suspension is reduced to a volume of about 50 ml. and then filtered whereupon 7.56 g. of 2,3-pyridinediol are obtained. M.P. 253–254° (in evacuated tube, Hershberg apparatus, corrected). The yield is 100%, calculated on the sodium salt of 3-hydroxy-2-oxo-1(2H)-pyridine sulphonic acid, and 43% calcuated on the furfural.

(d) Further 2,3-pyridinediol (about 1.75 g., corresponding to 10% of the theoretical) can be obtained from the mother liquor formed according to (b) of the sodium salt of 3-hydroxy-2-oxo-1(2H)-pyridine sulphonic acid by boiling it, cooling and continuously extracting it with diethyl ether analogously to (c).

Similar results are obtained when using in step (a) 40% potassium hydroxide solution. However, the yield of potassium 3-hydroxy-2-oxo-1(2H)-pyridine sulfonic acid obtained at the end of step (b) is somewhat lower due to tre greater solubility of the potassium salt in the reaction liquor.

EXAMPLE 2

30 ml. of concentrated hydrochloric acid are added to 100 ml. (about 0.10 mol) of a reaction solution prepared according to Example 1(a) and 15.0 g. (0.15 mol) of pulverised sulfamic acid are added while stirring at 2°. After stirring for about 5 minutes, this mixture turns into a thick slurry as a voluminous precipitate of the sodium salt of 3-hydroxy-2-oxo-1(2H)-pyridine sulphonic acid is formed. It is stirred for, in all, 30 minutes at 2°, then the mixture is heated for 10 minutes at 100° whereupon it is converted into a very dark, clear solution. After cooling, the pH of the mixture is adjusted to 4.5 by the addition of 40% sodium hydroxide solution and it is continuously extracted with diethyl ether. Impure 2,3-pyridinediol is obtained. By dissolving this in 250 ml. of methanol, decolouring the solution with active charcoal, concentrating the solution to about 40 ml., cooling the filtering, 3.36 g. of 2,3-pyridine-dio are obtained (30% of the theoretical); M.P. 249–252°.

EXAMPLE 3

19.2 g. (0.20 mol) of furfural and 30.0 g. (0.29 mol) of sulphaminic acid are dissolved at 0° in a mixture of 240 ml. of water and 60 ml. of concentrated hydrochloric acid. 14.2 g. (0.20 mol) of chlorine are added within 30 minutes at 0° while stirring, the acidity of the solution (3N hydrochloric acid) being kept constant by the addition of 40% sodium hydroxide solution (automatically under electrometric control). The reaction mixture is then stirred for 1 hour at 10°. The precipitated sodium salt of 3-hydroxy-2-oxo-1(2H)-pyridine suphonic acid is filtered, washed with ethanol and with ether and dried; yield: 2.80 g. (6.5% of the theoretical). The salt can be converted quantitatively into 2,3-pyridinediol as described in Example 1 (c). The mother liquor of the sodium salt is refluxed for 5 minutes, the pH adjusted to 4.5 with 40% sodium hydroxide solution and then continuously extracted with diethyl ether whereupon 2.90 g. (13% of the theoretical) of 2,3-pyirdinediol is obtained.

EXAMPLE 4

63 ml. of sodium hypochlorite solution (containing 11.2 g. of active chlorine per 100 ml.)/(0.10 mol) are added dropwise within 10 minutes at 0° while stirring to a solution of 9.6 g. of furfural (0.10 mol) in 15 ml. of tert.butyl alcohol and 30 ml. of 3 N hydrochloric acid. After a few minutes, 13 g. of sulphaminic acid (0.13 mol) and 10 ml. of concentrated hydrochloric acid are added and the reaction mixture is heated for 15 minutes at 100° whereupon the greater part of the butyl alcohol is distilled. After cooling to room temperature, the pH of the reaction mixture is brought to 4 by the addition of sodium hydroxide solution and the reaction mixture is continuously extracted with diethyl ether. On evaporating the diethyl ether and recrystalising the residue from methanol, 3.50 g. (32% of the theoretical) of 2,3-pyridinediol, are obtained; M.P. 244–247°.

EXAMPLE 5

15 g. of chlorine (0.21 mol) are introduced within 35 minutes while stirring vigorously at 0° into a solution of 19 g. of furfural (0.20 mol) and 1 g. of sodium bromide in 60 ml. of water and 30 ml. of acetic acid, the pH being kept at 1 by the addition of, in all, 33 g. of sodium acetate (0.40 mol). 200 ml. of water, 60 ml. of concentrated hydrochloric acid and 29 g. of sufamic acid (0.3 mol) are added to the reaction mixture at 10° and the mixture is stirred for 70 minutes at 10°. After cooling to 0° and adding 200 ml. of ethanol, the precipitated sodium salt of 3-hydroxy-2-oxo-1(2H)-pyridine sulphonic acid is filtered, washed with 80 ml. of ethanol and then with diethyl ether and dried in the air; yield: 15.3 g. (34% of the theoretical).

EXAMPLE 6

14 g. of chlorine (0.20 mol) are introduced at 0° while stirring vigorously into a suspension of 19 g. of furfural (0.20 mol) in 170 mol of water. After adding 19 g. of sulfamic acid (0.20 mol), the temperature of the reaction mixture is raised to 25° for 3 minutes whereupon the sulfamic acid dissolves and reacts with the oxidation product. The solution is cooled to 10° for 3 minutes and the sodium salt of the 3-hydroxy-2-oxo-1(2H)-pyridine sulphonic acid is precipitated by the addition of a solution of 23 g. of sodium chloride (0.39 mol) in 180 ml. of water. After the addition of 350 ml. of ethanol and cooling to −10°, the sodium salt of 3-hydroxy-2-oxo-1(2H)-pyridine sulphonic acid is filtered, washed with 80 ml. of ethanol and then with diethyl ether and dried in the air. The yield is 12.8 g. (29% of the theoretical).

EXAMPLE 7

63 ml. of sodium hypochlorite solution (containing 11.2 g. of active chlorine per 100 ml.) (0.010 mol) are added dropwise within 15 minutes at 0° while stirring to a solution of 9.6 g. of furfural (0.10 mol) and 0.5 g. of potassium iodide in 150 ml. of 1 N hydrochloric acid. After standing for 10 minutes, about 1.5 g. of sodium thiosulphate are added to decompose traces of active halogen. 25 ml. of concentrated hydrochloric acid, 6 g. of sodium chloride (0.10 mol) and 15 g. of sulfamic acid (0.15 mol) are added at 10° and the mixture is stirred for 70 minutes at 10°. After adding 350 ml. of ethanol and cooling to 10°, then sodium salt of 3-hydroxy-2-oxo-1(2H)-pyridine sulphonic acid formed is filtered, washed with 80 ml. of ethanol and then with diethyl ether and dried in the air. The yield is 9.6 g. (43% of the theoretical).

EXAMPLE 8

14 g. of chlorine (0.20 mol) are introduced at 0° while stirring vigorously into a suspension of 19 g. of furfural (0.20 mol) in 170 ml. of water. After adding 19 g. of sulfamic acid (0.20 mol), the temperature of the reaction mixture is raised to 25° for 3 minutes whereupon the sulfamic acid dissolves and reacts with the oxidation product. The mixture then is heated for 10 minutes at 100° whereupon it is converted into a very dark, clear solution. After cooling, the pH of the mixture which contains 2,3-pyridinediol dissolved as hydrochloride is adjusted to 3 by the addition of 40% sodium hydroxide solution and it is continuously extracted with diethyl ether. Impure 2,3-pyridinediol is obtained. By dissolving this in 250 ml. of methanol, decoloring the solution with active charcoal, concentrating the solution to about 40 ml., cooling and filtering, 3.36 g. of 2,3-pyridinediol are obtained (30% of thetheoretical); M.P. 249–252°.

What is claimed is:
1. A process for the production of 2,3-pyridinediol, consisting essentially of
    (a) hydrolizing an alkali metal 3-hydroxy-2-oxo-1(2H)-pyridine sulfonate in an aqueous medium, and
    (b) recovering the 2,3-pyridinediol from the resulting hydrolyzate by filtration or extraction.
2. A process as defined in claim 1, wherein step (b) is carried out by extraction with diethyl ether.

References Cited

UNITED STATES PATENTS 3,471,506  10/1969  Lei et al. _____ 260—297 R

ALAN L. ROTMAN, Primary Examiner

U.S. Cl. X.R.

260—294.8 R, 297 Z; 8—50